Oct. 25, 1966 R. W. MAY 3,281,101
LEVELABLE LOAD MOUNT
Filed May 18, 1964 2 Sheets-Sheet 1

Inventor:
RICHARD W. MAY
By
Dike, Thompson, Bronstein & Mrose
ATTORNEYS

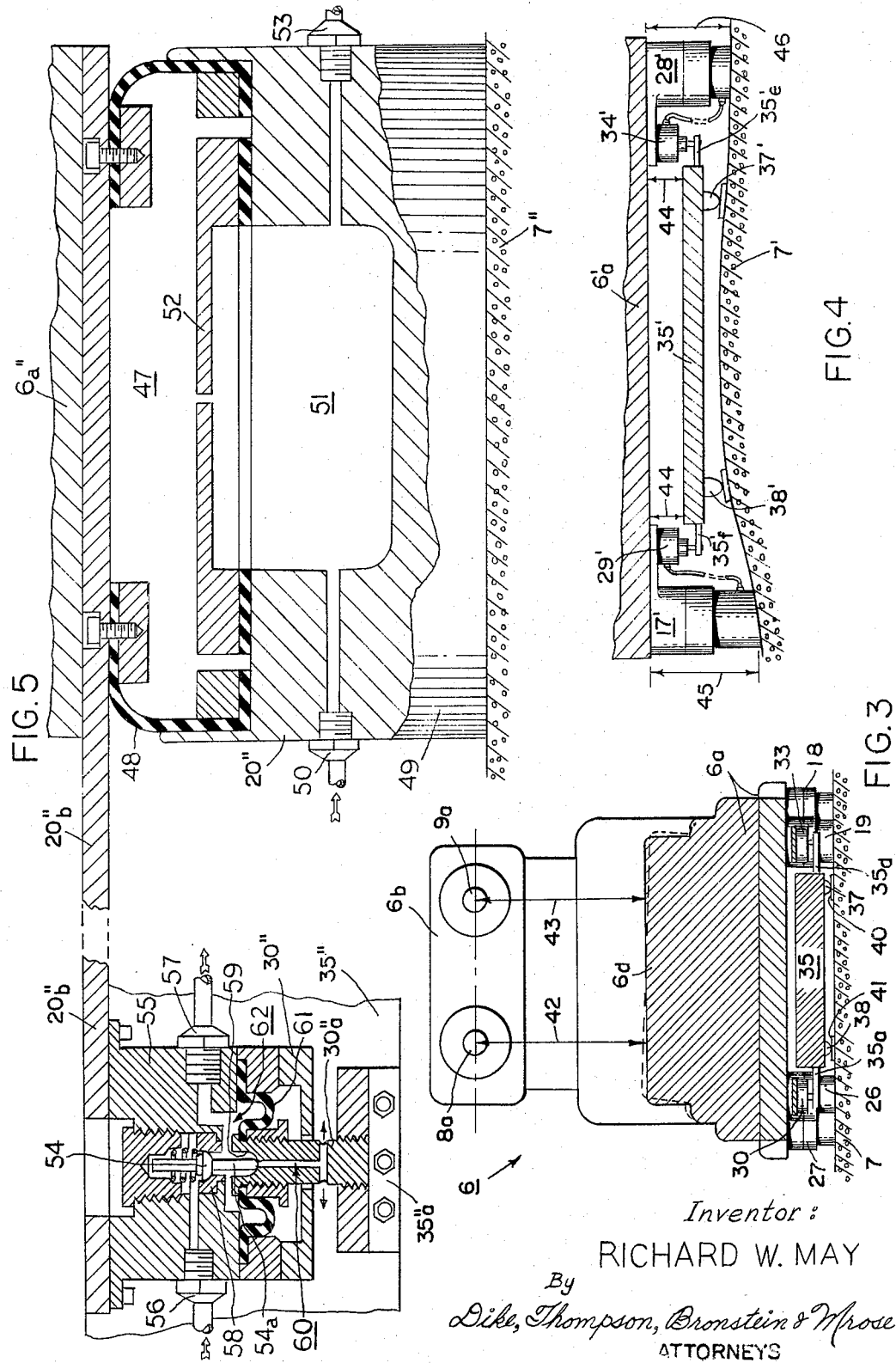

United States Patent Office 3,281,101
Patented Oct. 25, 1966

3,281,101
LEVELABLE LOAD MOUNT
Richard W. May, Lexington, Mass., assignor to Barry
Wright Corporation, Watertown, Mass., a corporation
of Massachusetts
Filed May 18, 1964, Ser. No. 368,273
11 Claims. (Cl. 248—22)

The present invention relates to improvements in the isolation and highly precise support of loads, and, in one particular aspect, to novel and improved apparatus for the dynamic suspension and isolation of massive loads, such as heavy industrial machinery, wherein unique servo-actuated isolators accurately preserve a prescribed relationship between the load and a reference plane which is established in relation to a common substructure by an independent three-point suspension.

Techniques for the dynamic support and vibration isolation of loads have heretofore been evolved using pressurized mounts in which fluid pressures are increased and decreased responsive to the dictates of sensitive control or pilot valves. Equipment of this general character can be designed to react so swiftly and accurately to changes in loadings as to preserve an essentially fixed orientation of the load in relation to its supporting foundation even under severe operating conditions, while at the same time isolating the transmissions of vibration and shock between the load and its foundation, damping vibrations of the load, and reducing the effective natural frequency of the supported load. Successful operation of such equipment inherently depends upon the existence of a perfectly stable foundation or equivalent support for the mounts and for setting the control valves; however, in many instances, the critical substructure is subject to bending or other distortion under changing thermal and loading conditions, or the like, and the load suspension then becomes correspondingly disturbed. Although the absolute values of irregularities thus caused in the orientation of various portions of a load may be relatively small, the consequent deleterious effects can be very substantial; by way of example, the slight bending of a machine-loaded concrete floor which has been laid upon a weak subsoil has been found to occasion such serious attendant misalignments of a machine's boring spindles as to preclude operation within intended limits of machining tolerances. Conventional types of pressurized mounts do not operate to overcome these difficulties, and, when improvement has been sought, it has been approached through the routine technique of strengthening the machine bed, or its underlying foundation, or both. The latter practices tend to be costly and troublesome, and to introduce undesirable bulk and mass. In accordance with the present teachings, however, such difficulties are circumvented economically and with remarkable simplicity and technical nicety by supporting a sensitive load upon a deformable substructure on pressurized mounts the operations of which are uniquely controlled in response to measurements of load relationships to a reference plane established independently by a reference unit supported on the same substructure.

It is one of the objects of the present invention, therefore, to provide novel and improved apparatus which develops isolated suspension of loads upon a substructure in controlled relation to an independently-created reference plane.

Another object is to provide unique and economical arrangements for the precision support of massive loads on pressurized mounts carried by substructures which are subject to deformation.

A further object is to provide novel and improved pressurized-fluid support systems wherein, for control purposes, a reference plane is established by an auxiliary three-point suspension.

Still further, it is an object to provide dynamic load-supporting levelling apparatus which includes a plurality of pressure-actuated mounts for automatically sustaining and positioning various parts of a massive load carried by a deformable foundation, the mounts being uniquely actuated by control valves which respond to variations in the orientations of the various parts of the load relative to a lightweight and uncomplicated non-distorting reference structure having an independent suspension.

By way of a summary account of practice of this invention in one of its aspects, a heavy industrial machine, which is susceptible to physical distortion when its multi-point support fails to produce an accurate levelling thereof, is rested upon a plurality of shallow pressurized air mounts distributed to sustain the machine loading at a plurality of positions. These mounts elevate the machine bed or base slightly above a supporting substructure, such as a concrete floor, when pressurized by a suitable air source through automatically-adjusted control valving. Independently supported on the same flooring, and preferably disposed closely intermediate the machine base and the concrete floor below, is a relatively lightweight and yet stiff reference plane device, which may conveniently take the form of a thin flat metal plate having three spaced supports which rest the plate upon the concrete substructure. A plurality of control valves, each having relatively movable control elements oriented respectively by the reference plate and the machine base, are located at distributed sites along the machine base and reference plate where the loadings tends to be variable and require precise counteraction by the mounts to preserve a substantially parallel relationship of the machine and the reference plane device. Each of these valves operates to admit and release air from one or more of the mounts in its immediate vicinity as it senses excessive and insufficient elevations of the proximate portion of the machine base relative to the proximate portion of the reference plate. These regulations insure that the machine base is at all times preserved accurately parallel with the flat reference plate, despite the occurrence of localized distortions on the surface of the substructure.

Although the aspects of this invention which are believed to be novel are set forth in the appended claims, additional details as to preferred practices of the invention and as to the further objects, advantages and features thereof may bee most readily comprehended through reference to the following description taken in connection with the accompanying drawings, wherein:

FIGURE 3 is a transverse cross-section of the same apparatus, taken along section line 3—3 in FIGURE 1;

Figures 1, 2:
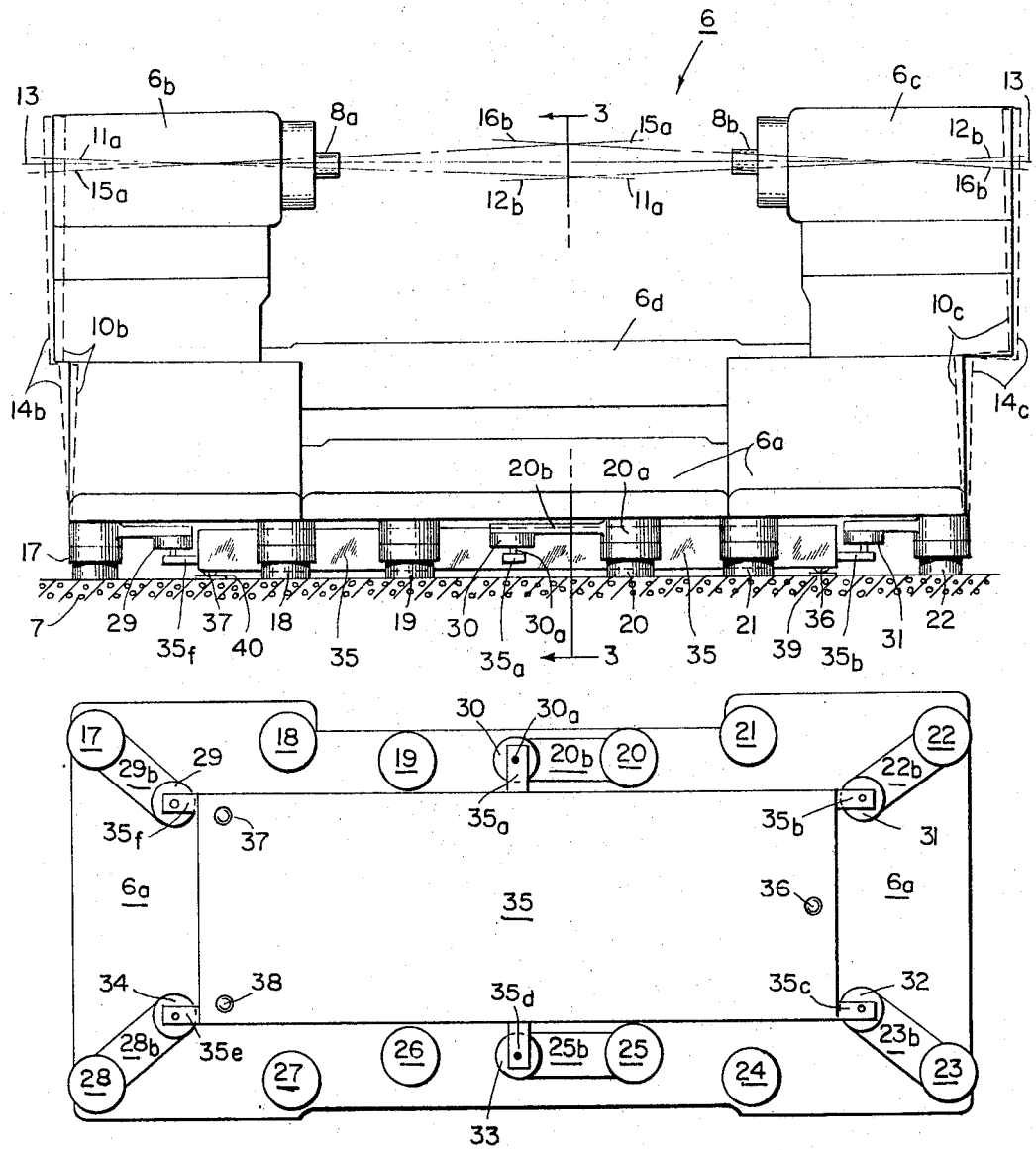
FIGURE 1 is a side view of a boring machine supported on a concrete substructure, a portion of which is portrayed in cross-section, by air mounts controlled in relation to a reference plane, in accordance with the present teachings.
FIGURE 2 illustrates the same structure, in a view directed upwardly from the substructure.

FIGURE 4 portrays a partly cross-sectioned fragment of an improved suspension generally like that of FIGURES 1–3, with substructure distortions and air mount displacements exaggerated as an understanding of operation of the invention; and FIGURE 5 depicts, in cross-section, constructions of an air mount and associated control valve which may be employed in one practice of these teachings.

The arrangement represented pictorially in FIGURES 1–3 includes a massive industrial machine 6 intended for use in precision machining operations or the like; the specific embodiment chosen for illustrative purposes comprises a generally U-shaped apparatus suitable for performing accurate boring, facing, turning, chamfering, or grooving operations on large heavy workpieces, and includes a massive rugged base or bed structure 6a having spaced upstanding end structures 6b and 6c between which the workpiece is mounted. Such precision machinery should be supported upon a special concrete flooring or equivalent high-strength substructure, 7, which is not only capable of withstanding the static and dynamic loadings imposed by the machine and its workpieces without rupture or failure but also resists such lower-level bending, sagging and other non-destructive distortions as will permit critical parts of the machinery to become distorted enough to impair its precision. By way of example, the upstanding portions 6b and 6c of machine 6 must be capable of maintaining extremely precise alignment between the oppositely-disposed pairs of boring spindles, including spindles 8a-8b (FIGURE 1) and 9a (FIGURE 3), which operate upon different sides of a large and weighty workpiece positioned upon a table carried by the center section 6d of the machine; inasmuch as the center section must be kept relatively low to accommodate the large workpieces conveniently, the machine base 6a may itself be so weak as to bend and twist with consequent misalignment of the boring spindle axes. In FIGURE 1, the ends deflections under workpiece loading tend to be of the sense characterized in exaggeration by dashed linework 10b and 10c, and the axis 11a—11a of spindle 8a, and axis 12b—12b of spindle 8b, thus tend to be deflected out of coincidence with the desired spindle alignment axis 13—13. Similarly, the non-uniform loadings upon deformable flooring 7 may cause end sagging of the sense characterized by dashed linework 14b and 14c, such that axis 15a—15a of spindle 8a, and axis 16b—16b of spindle 8b, tend to be deflected upwardly out of coincidence with the spindle alignment axis 13—13. Unless both the substructure and the machine framework are made uncommonly stiff and sturdy, the aforementioned types of misalignment problems can arise, in various directions, and the intended precision can be lost and the machinery discredited. The obvious corrective measures, involving auxiliary reinforcements, or large-scale reconstructions, may entail heavy capital expenditures, inconvenience, loss of valuable time, waste of material, and increased factory loadings.

The foregoing considerations apply whether the machinery is rested directly upon the flooring or is, instead, supported on the substructure by a plurality of pressurized mounts, such as are commonly used to provide isolation of shock and vibration forces and, often, as components of a weighing system. Twelve such mounts, 17-28, of a known air-pressurized type are depicted in association with the embodiment of FIGURES 1-3, both for the aforesaid isolation purposes and, in particular, to develop improved levelling which avoids the distortion problems already referred to. These mounts are expansible and compressible units, of a shallow broad-area construction, functioning in the manner of a bellows or a piston-cylinder assembly, and pairs of them are variably pressurized from a compressed air source (not shown) through the six control valves 29-34. The latter valves are preferably of a known construction employed heretofore for straightforward height-control purposes, and each includes a movable valve member which is adjusted in relation to a seat to permit more or less of the pressurized air being supplied to the mounts to escape, depending upon the relative heightwise orientations of a proximate part of the machine and a proximate part of a stiff flat reference plate 35. As these proximate parts move closer, by even minute amounts, the control valve becomes further closed, thus causing the pressure within one pair of mounts nearby to be increased and thereby causing an expansion of these mounts which raises the proximate part of the machine in relation to the flooring until the original separation between these proximate parts (of the machine and reference plate) is accurately restored. Conversely, even minute increases in the separation between these parts causes the control valve to become further opened, and the pressure within the associated pair of mounts thereupon decreases with attendant lowering of their forces exerted between the flooring and the proximate part of the machine, such that the original separation between these proximate parts (of the machine and reference plate) is accurately restored. In this connection, it is important to note that the separations between the flooring and machine bed at the various positions where the mounts are active may vary significantly, whereas the separations between the reference plate 35 and the machine bed are maintained precisely the same despite distorting effects which are present either on the flooring or on the machine.

Preferably the illustrated air mounts 17, 19, 22, 23, 25, and 28 are pneumatically paired with the mounts 18, 20, 21, 24, 26 and 27, respectively, for optimum load support, in the sense that each pair (such as the pairs 17-18, 19-20, and so forth) is supplied with a common air pressure through the independent regulating action of a different one of the six control valves. Flexible tubing (not illustrated) connects the air supply to the mounts through the control valves, as prescribed hereinabove. Each pair of mounts, and the associated control valve, operates to perform automatic measurements and to provide automatic lift as needed at a different support location where deformation might otherwise disturb the machine support; in other applications, one, or more than two mounts, may also be made responsive to the pressure regulations exercised by each control valve. For convenience in manufacture and installation, the control valves may be physically integrated with certain of the mounts; taking mount 20 as an example, its relatively movable upper section 20a, on which the machine bed rests, is shown to have an integral rigid extension 20b from which the housing of control valve 30 is hung, and the relatively movable control valve stem 30a, is thus properly located for heightwise orientation relative to the valve housing by a rigid extension 35a from the reference plate 35. The other mount extensions and valve stems are of corresponding construction and arrangement, at different sites, and are therefore designated by corresponding reference numerals having corresponding subscripts; the remaining rigid extensions 35b-35f from reference plate 35 cooperate similarly with the movable control valve members.

The reference plate extensions 35a-35f, which serve to orient the relatively movable control valve members, all lie in substantially one plane, which is effective as a reference plane for the improved levelling arrangement. Unloaded plate 35 maintains these extensions in one plane because of its inherent stiffness and because of its three-point suspension atop the substructure on the three spaced projections 36-38. Preferably, these projections are spherically rounded, and rest upon hard smooth metal plates 39-41 on the relatively rough concrete flooring 7. Although a solid generally rectangular reference plate has been illustrated, to provide the necessary inflexibility and stability while remaining thin enough to fit conveniently under the machine bed without engaging it, other stiff reference structures serving the same functions may be fabricated of several parts and may exhibit different configurations appropriate for the intended installations.

The differing dimensions 42 and 43 between the locations of spindle centers and machine bed in FIGURE 3 characterize the difficulties which can arise because of machine twisting; in the absence of the improved levelling system, such dimensional differences can persist and thereby impair the machining precision. As is portrayed in FIGURE 4, a reference plate 35', supported at three points on a substructure 7' by projections such as 37' and 38', acts to preserve a uniform separation 44 between reference plane and the base 6a' of a supported massive structure, even though the spacings such as 45 and 46 between that base and the supporting surface of the substructure may be significantly different from time to time due to the illustrated type of flooring distortions (exaggerated for clarity). Elements in FIGURE 4 which are functional equivalents of those appearing in FIGURES 1–3 are identified by the same reference characters, with distinguishing single-prime accents added, and the mode of operation will thus be understood to be like that of the apparatus described earlier herein.

By way of example of known forms of control valve and air mount devices which may be adapted to service in the improved levelling apparatus, there are shown, in FIGURE 5, a control valve 30″ and air mount 20″, corresponding generally with the elements 30 and 20 in FIGURES 1–3; other corresponding parts are similarly identified, with distinguishing double-prime accents applied. In the mount 20″, a main load-supporting air chamber 47 is formed between a flexible elastomeric diaphragm 48 and the casing 49 with which it is sealed. The machine frame 6a″ rests upon the plate-like extension member 20b″, and may thus be elevated or lowered depending upon the pressurization of air within chamber 47. Coupling 50 admits regulated pressurized air into the accumulator chamber 51 in the casing, from whence it may pass to the main chamber 47 through a restrictor 52 which functions to damp the air flow, and the same regulated pressure is also communicated to a companion mount (such as mount 19 in FIGURE 2) by way of coupling 53. Fluid pressures are regulated by the positions of movable control valve member 30a″ relative to another cooperating valve member, 54, within the casing 55 of control valve 30″. Relative positions of the member 30a″ and casing 55 vary with the heightwise variations in the spacings between the reference plate extension 35a″ and mount extension member 20b″ to which they are respectively attached. Inlet coupling 56 admits pressurized air into the casing 55 from a source of compressed air (not shown), and an outlet coupling, 57, delivers the regulated pressurized air to the aforementioned inlet connection 50 for the air mount 20″. Flow of air into valve 30″ is controlled by vertically-slidable valve stem member 54, which has a valving enlargement spring-biased into fitted engagement with a seat 58 in the casing 55; a downward extension 54a of the same stem member is positioned for engagement and seating with an upwardly-facing seat 59 at the upper end of valve member 30a″, the latter having a longitudinal valved flow passageway 60 therein which communicates laterally with the ambient atmosphere outside of casing 55. Flexible sealed elastomeric diaphragm 61 permits vertical relative movements between the member 30a″ and casing 55 without unintended leakage. When the spacing between the supported part of the machine and the reference plane defined by plate 35″ and its extension 35a″ decreases from a predetermined value, valve member 30a″ forces valve member 54, upwardly, thereby admitting fluid from inlet coupling 56 into the control valve chamber 62 from whence it is passed to the mount 20″ through couplings 57 and 50. By-pass passageway 60 is closed at such times, and the pressure within main chamber 47 of the mount 20″ increases and causes the machine to be restored to its original heightwise relationship to the reference plane. An increase in the aforesaid separation results in such an opening of the passageway 60 that enough fluid escapes therethrough from the mount to occasion restoration of the original heightwise relationship between the machine and reference plane.

Fluids other than air may of course be employed in the improved system, and alternate equivalent forms of valving and mounts may likewise be exploited. The structure which establishes the reference plane may have configurations other than that illustrated, as has already been noted herein, and may be located where convenient, provided it responds to the conditions intended to be measured. In some instances, the three-point suspension for the reference structure need not include support points integral with the structure and these may, instead, be separate support elements mounted on another plate, or directly on the flooring, and so forth. A reference structure for a load-support system may also be cascaded with another, by being carried by a plurality of mounts which are, in turn, responsive to the relative heightwise orientations between that reference structure and a further smaller reference structure which has a three-point suspension.

Accordingly, it should be understood that the specific embodiments and practices herein described have been presented by way of disclosure rather than limitation, and that various modifications, substitutions and combinations may be effected without departure in spirit or scope from this invention in its broader aspects.

What I claim as new and desire to secure by Letters Patent of the United States is:

1. Apparatus adapted to mount a load in relation to a supporting structure, comprising adjustable mount means, means for connecting said mount means with a load for mounting the load in relation to a supporting structure, substantially stiff reference means for providing set reference points for control means, means for mounting said stiff reference means in relation to a supporting structure independently of said adjustable mount means, and control means having relatively movable parts connectable with the load and connected with said reference means, respectively, controlling said adjustable mount means in accordance with the movements between said parts, whereby said mount means tends to maintain a predetermined orientation of a load mounted thereon in relation to said reference means.

2. Apparatus adapted to mount a load in relation to a supporting structure, comprising mount means including two portions the relative positions of which are adjustable, means for connecting one of said portions with a load and the other of said portions with a supporting structure, respectively, substantially stiff reference means for providing set reference points for control means, means for mounting said reference means in relation to a supporting structure independently of said adjustable mount means, and control means having relatively movable parts connected with said one of said portions and connected with said reference means, respectively, controlling said adjustable mount means in accordance with the movements between said parts to adjust the relative positions of said two portions and thereby maintain a predetermined orientation of said one of said portions of the mount means in relation to said reference means.

3. Apparatus adapted to mount at least one portion of a load in relation to a supporting structure, comprising adjustable load mount means including two relatively movable portions the relative positions of which are adjustable, means for connecting one of said portions of said load mount means with one portion of a load and the other of said portions with a supporting structure, respectively, substantially stiff reference means for providing set reference points for control means, means for mounting said reference means in relation to a supporting structure independently of said load mount means, and control means having relatively movable parts connected with said one of said portions of said mount means and connected with one portion of said reference means, respectively, controlling said adjustable load mount means in accordance with the movements between said parts to adjust the relative positions of said two movable portions and thereby maintain a predetermined orientation of said one of said portions of said load mount means and said one portion of said reference means.

4. Apparatus adapted to mount at least one portion of a load in relation to a supporting structure, as set forth in claim 3, wherein said adjustable load mount means comprises a fluid pressure responsive device, wherein said control means includes valve means for varying the fluid pressure within said device in response to relative movements between said relatively movable parts of said valve means which are respectively connected in predetermined relationship with said one portion of said reference means and connectable with said one of said portion of said mount means, and wherein said means for mounting said reference means tends to preserve predetermined portions of said stiff reference means, including said one portion of said reference means, in substantially one plane.

5. Apparatus adapted to mount at least one portion of a load in relation to a supporting structure, as set forth in claim 4, wherein said means for mounting said reference means in relation to the supporting structure comprises a three-point suspension.

6. Apparatus adapted to mount at least one portion of a load in relation to a supporting structure, as set forth in claim 5, wherein said substantially non-deformable reference means comprises a substantially flat plate-like member.

7. Apparatus adapted to mount a load such as a machine or the like in relation to a floor, comprising a plurality of load mounts each including two relatively movable portions the positions of which are adjustable, means for connecting one of said portions of each of said load mounts with a different portion of a load and for connecting the other of said portions of each of said load mounts with a different portion of a floor, substantially stiff reference means for providing set reference points for control means, three-point suspension means connected with said reference means for mounting said reference means on a floor, and a plurality of control means each having relatively movable parts one of which is connected with a different portion of said reference means and another of which is connectable with a different portion of a load and each controlling a different one of said load mounts proximate therewith in accordance with the movements between its said movable parts, whereby said control means adjust the relative positions of said relatively movable portions of said mounts and thereby tend to maintain in a predetermined orientation said different portion of said reference means and different portions of a load mounted on said load mounts.

8. Apparatus adapted to mount a load such as a machine or the like in relation to a floor, as set forth in claim 7, wherein each of said load mounts comprises a fluid pressure responsive device for mounting a different portion of a load above a floor, and wherein each of said control means includes valve means for increasing and decreasing the fluid pressure within at least one but less than all of said load mounts, each of said valve means including said relatively movable parts in the form of cooperating valve parts for increasing and decreasing said fluid pressure responsive to variations in said orientations therebetween in different heightwise directions.

9. Apparatus adapted to mount a load such as a machine or the like in relation to a floor, as set forth in claim 7, wherein said substantially stiff reference means comprises a substantially flat plate-like member.

10. Apparatus adapted to mount a load such as a machine or the like in relation to a floor, as set forth in claim 9, wherein said three-point suspension mount means is disposed to mount said plate-like member on a floor below and in spaced relationship to a load mounted on said load mounts.

11. Apparatus adapted to mount a load such as a machine or the like in relation to a floor, as set forth in claim 10, wherein relatively movable parts of each of said control means are positioned to respond to relative displacements between proximate portions of said plate-like member and a load, and wherein each of said control means actuates at least one of said load mounts which is connectable with a portion of a load in proximity with said control means.

References Cited by the Examiner

UNITED STATES PATENTS

| | | | |
|---|---|---|---|
| 2,908,472 | 10/1959 | McDonald | 248—346 |
| 3,013,810 | 12/1961 | Hanna | 280—124 |
| 3,044,799 | 7/1962 | Fiala | 267—11 X |
| 3,157,413 | 11/1964 | Alfieri | 280—124 |
| 3,162,465 | 12/1964 | Vaugoyeau | 280—124 |

CLAUDE A. LE ROY, *Primary Examiner.*

J. PETO, *Assistant Examiner.*